United States Patent [19]

Miller

[11] 4,352,522
[45] Oct. 5, 1982

[54] AUTOMOBILE HEADLINER AND METHOD OF MAKING SAME

[75] Inventor: Donald E. Miller, Livonia, Mich.

[73] Assignee: Allen Industries, Inc., Troy, Mich.

[21] Appl. No.: 191,609

[22] Filed: Sep. 29, 1980

[51] Int. Cl.³ ............................................. B60J 7/00
[52] U.S. Cl. .................................. 296/214; 296/31 P; 428/157
[58] Field of Search ............. 296/214, 31 P; 428/157, 428/126, 124

[56] References Cited

U.S. PATENT DOCUMENTS

| | | | |
|---|---|---|---|
| 3,876,246 | 4/1975 | Lutz | 296/214 |
| 4,099,767 | 7/1978 | Kania | 296/214 |
| 4,131,702 | 12/1978 | Alfter | 296/214 |
| 4,172,918 | 10/1979 | Doerer | 296/214 |
| 4,188,440 | 2/1980 | Doerer | 296/214 |
| 4,256,797 | 3/1981 | Stamper | 296/214 |

Primary Examiner—Joseph F. Peters, Jr.
Assistant Examiner—John A. Carroll
Attorney, Agent, or Firm—Joseph V. Tassone

[57] ABSTRACT

An automobile headliner and method of making same are provided wherein such headliner comprises a substrate defined by a compacted and rigidified fibrous material with the substrate having a peripheral portion which is more highly compacted than the remainder thereof and a decorative sheet is bonded to the substrate to define a single-piece laminate which has a solid cross section throughout and wherein the peripheral portion has an annular enlargement and the decorative sheet covers the enlargement and defines a sheet-covered enlargement which serves as an integral garnish molding for the headliner.

19 Claims, 6 Drawing Figures

AUTOMOBILE HEADLINER AND METHOD OF MAKING SAME

BACKGROUND OF THE INVENTION

1. Field of the Invention

This invention relates to an automobile headliner construction and method of making same.

2. Prior Art Statement

It is known in the art to provide headliners for passenger compartments of automobiles and similar vehicles; however, because of the highly competitive nature of the automobile industry the need exists for a headliner which has thermal insulating properties, acoustical properties, and aesthetic appeal yet may be produced at minimum cost.

In presently known automobile headliner constructions it is common practice to provide a headliner which is attached to the automobile roof together with a separate garnish molding which is attached between the headliner and the remainder of the automobile. However, with such an installation, it is necessary to provide the headliner and garnish molding as separate parts and inherently this results in increased automobile weight, additional costs for materials, and additional costs to manufacture and install each headliner and its garnish molding.

SUMMARY

It is a feature of this invention to provide an economical automobile headliner construction or headliner particularly adapted for use in an automobile and which has a garnish molding defined as an integral part thereof and wherein the headliner is of minimum weight, may be made using a minimum amount of material, and may be installed with minimum labor costs.

Another feature of this invention is to provide a headliner of the character mentioned which has optimum aesthetic appeal.

Another feature of this invention is to provide a headliner of the character mentioned comprised of a substrate defined by a compacted and rigidified fibrous material with the substrate having a peripheral portion which is more highly compacted than the remainder thereof, a decorative sheet, and means bonding the substrate and decorative sheet together as a single-piece laminate having a substantially solid cross section throughout; and, wherein the peripheral portion has an annular enlargement and the decorative sheet covers the enlargement and defines a sheet-covered enlargement which serves as an integral garnish molding for the headliner.

Another feature of this invention is to provide a headliner of the character mentioned wherein the peripheral portion has an inside surface which is adapted to be disposed adjacent the roof of an automobile and the enlargement when viewed in cross section has a peripheral strip which is substantially parallel to the inside surface and a convex part inwardly of the peripheral strip with the convex part being convex generally away from the roof and toward the interior of the automobile and with the peripheral strip and convex part having the decorative sheet bonded thereagainst and comprising the sheet-covered enlargement.

Another feature of this invention is to provide a headliner of the character mentioned wherein the sheet-covered enlargement has a hollow rear portion.

Another feature of this invention is to provide a headliner of the character mentioned wherein the sheet-covered enlargement is also of solid cross section throughout.

Another feature of this invention is to provide a headliner of the character mentioned in which the substrate has a main central area which is comparatively less compacted and particularly adapted to provide thermal and acoustical insulation at minimum cost and wherein the main central area has a thickness which is generally of the order of several times greater than the thickness of the peripheral portion.

Another feature of this invention is to provide a headliner of the character mentioned in which the fibrous material is compacted and rigidified and held in its rigidified state by a phenolic resin.

Another feature of this invention is to provide a headliner of the character mentioned which has attaching means comprising the garnish molding and defining the sole means for attaching the headliner to an associated automobile.

Another feature of this invention is to provide an improved method of making a headliner of the character mentioned.

Therefore, it is an object of this invention to provide an improved headliner and method of making same having one or more of the novel features set forth above or hereinafter shown or described.

Other details, features, uses, objects, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DETAILED DESCRIPTION

Figure 1:
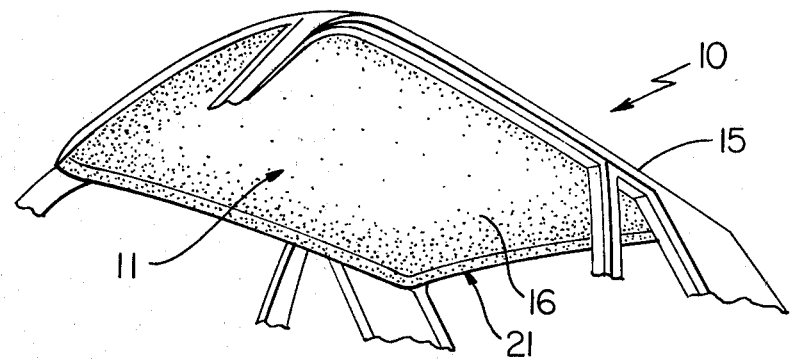
FIG. 1 is a fragmentary perspective view of a roof structure of an exemplary automobile which has one embodiment of the headliner of this invention suitably attached in position and defining the interior of such structure.

Reference is now made to FIG. 1 of the drawing which illustrates a fragmentary portion of an automobile which is designated generally by the reference numeral 10 and the automobile 10 employs one exemplary embodiment of an automobile headliner construction or headliner of this invention which is designated generally by the reference numeral 11. The headliner 11 has optimum aesthetic appeal and may be readily installed by a comparatively unskilled craftsman either as a new component of the automobile 10 during assembly thereof or as a replacement for a previously installed and damaged headliner.

Figure 2:
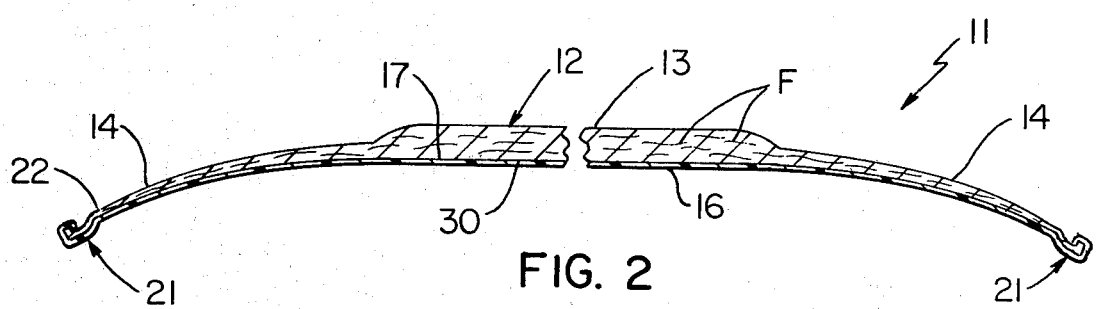
FIG. 2 is a cross-sectional view of the headliner of FIG. 1 taken transverse the longitudinal dimension of the roof structure with a central portion of such headliner broken away.

Referring now to FIG. 2 of the drawing, it is seen that the headliner 11 is comprised of a substrate which is designated generally by the reference numeral 12 and the substrate 12 has a main central portion or central area 13 and a peripheral portion 14 extending around the central area 13. The central area 13 is particularly adapted to underlie the main central part of a roof of an automobile such as the roof 15 of the automobile 10.

The substrate 12 is defined by compacted and rigidified fibrous material comprised of fibers F as will be described in more detail subsequently. The peripheral portion 14 is more highly compacted than the remainder thereof whereby the headliner 12 may be firmly attached and held in position to define the inside of the roof 15 of the automobile 10 merely by attaching the peripheral portion 14 in position.

The headliner 11 also comprises a decorative sheet 16 and means, which may be in the form of adhesive means 17, disposed between the substrate 12 and the decorative sheet 16 whereby the adhesive means 17 bonds the substrate 12 and sheet 16 together as a single-piece laminate which has a substantially solid cross section throughout. This reference to solid cross section throughout refers to the fact that at any of an infinite number of cross-sectional positions, the single-piece laminate is defined of the decorative sheet 16 and substrate 12 (free of large voids, or the like, in the substrate) with the substrate consisting of adhesively bonded fibers F which are compacted and held together as a unitary mass. The central area 13, though described as of solid cross section, has substantial air spaces between fibers F because it is comparatively less compacted than the peripheral portion 14. Because the peripheral portion 14 is highly compacted it has a minimum of air spaces between fibers and is practically free of such air spaces.

Figure 3:
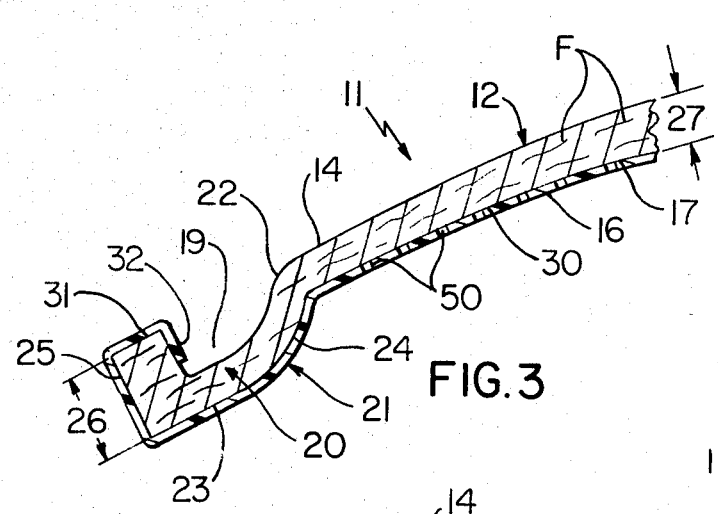
FIG. 3 is an enlarged fragmentary cross-sectional view illustrating the left side portion of the headliner of FIG. 1 which is typical of each and every side portion of such headliner.

The peripheral portion 14 of the substrate 12 has an annular molding-like portion or enlargement which extends completely around the headliner 11 and such annular enlargement is illustrated in enlarged cross-sectional view in FIG. 3 and designated generally by the reference numeral 20. It will be seen that the decorative sheet 16 covers the enlargement 20 and thereby defines a sheet-covered enlargement which serves as an integral garnish molding for the headliner and such integral garnish molding will be designated generally by the reference numeral 21.

As will be readily apparent from FIGS. 2 and 3 of the drawing, the peripheral portion 14 has an inside surface 22 which is adapted to be disposed adjacent the inside surface of the roof 15 of the automobile 10. The enlargement 20 when viewed in cross section (such as the typical cross section shown in FIG. 3) is defined by offsetting the outer end of portion 14 to define a hooking end therein which hooks away from sheet 16. The enlargement 20 thus has a hollow rear portion 19 and has a peripheral strip 23 which is substantially parallel to the inside surface 22 and a convex part 24 disposed inwardly of the peripheral strip with the convex part being convex generally away from the roof 15 and toward the interior of the automobile 10. The peripheral strip 23 and convex part 24 have the decorative sheet 16 bonded thereagainst and comprise the sheet-covered enlargement which serves as the previously mentioned integral garnish molding 21.

The enlargement 20, when viewed in cross section, also has a peripheral edge 25 which has an effective thickness 26 which is greater than the thickness 27 of the peripheral portion and the thickness 26 of this example is roughly two times greater than the thickness 27. The peripheral edge 25 of the peripheral portion 14 is disposed roughly perpendicular to the peripheral strip 23 and the decorative sheet 16 is bonded against the entire surface 30 of the substrate 12 which will be in close proximity to the interior of the automobile 10 once the headliner 11 is installed in position. Accordingly, the sheet 16 is bonded against surface 30 (which has strip 23 and convex part 24 comprising such surface), against the peripheral edge 25, and against an L-shaped surface portion 31 of the inside surface 22 which adjoins the peripheral edge 25. The L-shaped surface portion 31 has an edge turned part 32 of the decorative sheet 16 disposed thereagainst. The edge turned part 32 has a dimension which is roughly equal to the width of the strip 23.

As previously mentioned, the substrate 12 has a main central area 13 which is comparatively less compacted than the remainder of the substrate 12 and in particular substantially less compacted than the peripheral portion 14 of said substrate. The comparatively less compacted central area 13 provides improved thermal and acoustical insulation for the interior of the automobile 10 and it will be seen that the central area 13 has a thickness which is generally of the order of several times greater than the thickness of the peripheral portion 14. Although in this example, the central area 13 has a thickness generally of the order of several times greater than the thickness of the peripheral portion 14, it is to be understood that the central area 13 may have any desired thickness including a greater thickness than described or a thickness which may approach the thickness of the peripheral portion.

The substrate 12 is preferably made of a fibrous material or fibers F, as previously mentioned, and may utilize garnetted stock which may be in the form of a blanket and such stock may be comprised of the usual fibers whether of natural or synthetic origin. For example, the fibers may be wool, cotton, rayon, fiberglass, and the like either alone or in various blends. The fibers of the substrate 10 are preferably suitably bonded and held together as a unitary single-piece structure or mass by suitable adhesive means.

The fibers F may be bonded together by treating the exposed surfaces thereof with a thermosetting resin such as a phenolic resin. The phenolic resin serves to bond the fibers together as a unitary mass during the process of making the substrate 12 and such process includes placing a layer, blanket, or the like of loosely held fibers F which have been treated with a suitable resin between cooperating contoured forming platens of a press. The treated fibers F are then subjected to a controlled pressure and temperature and the cooperating contoured forming platens define the contour of the substrate 12. The formed substrate 12 is then suitably cooled and is ready for further processing. It will be appreciated that the temperatures and pressures required to form substrate 12 with the desired contour and rigidity will vary depending upon the fibrous material employed, the thermosetting resin utilized, and the desired characteristics of the completed substrate 12 and such temperatures and pressures are within the skill of the art.

Once the substrate 12 is defined, the decorative sheet 16 is suitably bonded thereagainst preferably employing adhesive means 17. Accordingly, the adhesive 17 may be applied against the main surface 30 of the substrate (including the convex part 24 and peripheral strip 23), against the peripheral edge 25, and against a part of the L-shaped surface portion 31 of the inside surface 22 sufficient to adhere the edge turned part 32 of sheet 16 thereagainst. The sheet 16 is then pressed against the applied adhesive 17; and, a suitable press having contoured platens may be used for this purpose, if desired. Alternately, the adhesive 17 may be applied against the inside surface of the sheet 16. Also, the adhesive bonding of the edge turned part 32 may be achieved either manually or automatically in the above-mentioned press.

The headliner 11 may be attached to the roof 15 utilizing any suitable attaching means known in the art. The headliner 11 is preferably attached in position by concealed attaching devices 33. Each attaching device 33 (FIG. 4) has a portion 34 which is adapted to be fastened to the enlargement 20 and a locking portion 35. The locking portion 35 is comprised of a pair of split saw-toothed spring clips 36 which are adapted to be urged toward each other and inserted through an associated opening 37 in an associated bracket 40 in the roof structure 15 until locking shoulders 41 on clips 36 move through the opening 37 and then snap lock against inside surface 42 of the associated bracket 40. Portion 34 of the attaching device 33 has a pair of bearing members 44 fixed on opposite sides of the strip 23 which hold the locking device firmly in position.

Figure 4A:
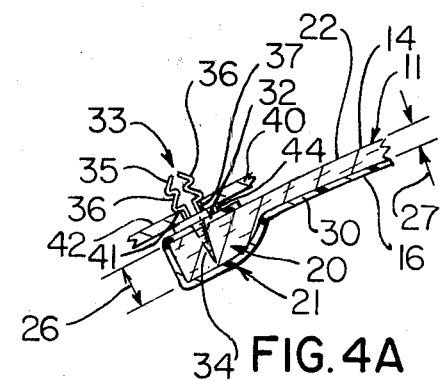
FIG. 4A is a fragmentary view similar to FIG. 4 illustrating a side portion of another embodiment of the headliner of this invention and a modified concealed attaching means therefor.
Figure 4:
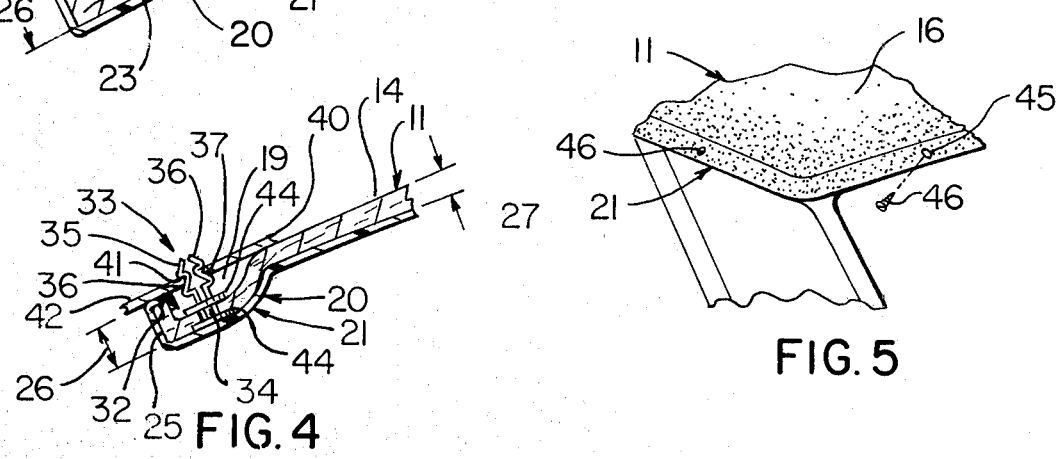
FIG. 4 is a fragmentary view showing typical concealed attaching means which may be used to attach the headliner of FIGS. 1-3 in position.

A modification of the headliner 11 is shown in FIG. 4A of the drawing. This modified headliner is very similar to the previously described headliner and has peripheral portion 14 provided with inside surface 22 which is adapted to be disposed adjacent the inside surface of the automobile roof 15; however, this portion 14 has an annular enlargement 20 which is of solid cross section throughout. The decorative sheet 16 covers the enlargement 20 and defines a sheetcovered enlargement or integral garnish molding 21 for the headliner 11; and such enlargement when viewed in cross section, also has a peripheral edge 25 which has an effective thickness 26 which is greater than the thickness 27 of the peripheral portion.

The sheet 16 in the headliner of FIG. 4A is bonded against surface 30, against peripheral edge 25, and against a width of the inside surface 22 which adjoins the peripheral edge 25 and such width defines an edge turned part 32 of the decorative sheet 16.

The headliner 11 of FIG. 4A may be attached to the roof 15 utilizing modified concealed attaching devices 33. Each device 33 of FIG. 4A has an inner screw threaded portion 34 which is threaded in the enlargement 20 and an outer locking portion 35. The portion 35 has spring clips 36 which are inserted through an associated opening 37 in roof bracket 40 until locking shoulders 41 on clips 36 move through opening 37 and then snap lock against inside surface 42 of bracket 40. The device 33 also has a bearing member 44 which limits the amount that portion 34 can be threaded within the solid enlargement 20.

Figure 5:
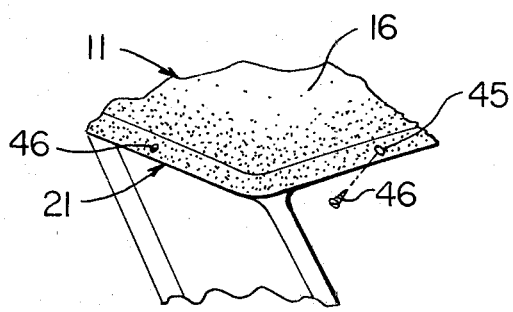
FIG. 5 is a fragmentary view of a modification of the headliner of FIG. 1 illustrating another embodiment of attaching means for such headliner.

Although the headliner 11 is preferably attached in position utilizing a device such as the attaching device 33 which provides concealed attachment, the headliner 11 may be provided with more conventional attaching means and as shown in the modification of such headliner which is presented in FIG. 5. In the modification of FIG. 5, a plurality of spaced openings 45 are provided through the garnish molding 21 including the decorative sheet 16 and the enlargement 20 in the substrate 12. A threaded fastening screw 46 may be extended through an associated opening 45 and threadedly received within a cooperating opening in the structure 15.

The decorative sheet 16 may be made of any suitable material employed in the art. For example, the decorative sheet may be made of natural material, such as leather, synthetic plastic material, woven material, nonwoven material, soft felt-like material, and the like. A sheet 16 made of synthetic plastic may have the appearance of leather or may have the appearance of a woven material by providing raised portions thereon simulating warps and wefts of a woven material.

The decorative sheet 16 also preferably has opening means extending therethrough for the purpose of improving the acoustical properties of the overall headliner 11. In the case of a sheet 16 made of synthetic plastic material it preferably has a plurality of spaced openings extending therethrough and a typical representative few of such openings are illustrated in FIG. 3 and each designated by the reference numeral 50. The openings 50 may extend through the plastic sheet 16 in any desired predetermined pattern.

However, regardless of the detailed construction of the decorative sheet 16, such sheet 16 may be bonded by adhesive 17 directly against the substrate 12 or a backing of elastomeric foam material (not shown) may be bonded against the inside surface of the sheet 16 and such foam material may then, in turn, be bonded against the substrate 12.

While present exemplary embodiments of this invention, and methods of practicing the same, have been illustrated and described, it will be recognized that this invention may be otherwise variously embodied and practiced within the scope of the following claims.

What is claimed is:

1. In an automobile headliner comprising, a substrate defined by a compacted and rigidified fibrous material, said substrate having a peripheral portion which is more highly compacted than the remainder thereof, a decorative sheet, and means bonding said substrate and decorative sheet together as a single-piece laminate having a substantially solid cross section throughout, the improvement wherein said peripheral portion has an annular enlargement and said decorative sheet covers said enlargement and defines a sheet-covered enlargement which serves as an integral garnish molding for said headliner, said peripheral portion has an inside surface which is adapted to be disposed adjacent the roof of an automobile, said enlargement when viewed in cross section has a peripheral strip which is substantially parallel to said inside surface and a convex part inwardly of said peripheral strip, said convex part upon being disposed adjacent said roof being convex generally away from said roof and toward the interior of said automobile, said peripheral strip and convex part having said decorative sheet bonded thereagainst and comprising said sheet-covered enlargement, and said enlargement when viewed in cross section has a peripheral edge which has an effective thickness which is greater than the thickness of said peripheral portion.

2. A headliner as set forth in claim 1 in which said enlargement has a hollow rear portion.

3. A headliner as set forth in claim 1 in which said enlargement is also of solid cross section throughout.

4. A headliner as set forth in claim 1 in which said peripheral edge has an effective thickness which is generally of the order of several times greater than the thickness of said peripheral portion.

5. A headliner as set forth in claim 1 in which said peripheral edge is disposed roughly perpendicular to said peripheral strip, said decorative sheet is bonded against said edge and a surface portion of said inside surface which adjoins said peripheral edge, and said surface portion defines an edge turned part of said decorative sheet.

6. A headliner as set forth in claim 1 in which said substrate has a main central area which is comparatively less compacted and is particularly adapted to provide thermal and acoustical insulation, and said main central areas has a thickness which is generally of the order of several times greater than the thickness of said peripheral portion.

7. A headliner as set forth in claim 6 in which said fibrous material is defined by a thickness of randomly disposed discrete fibers which have been compacted and rigidified, said fibrous material being held in its rigidified state by adhesive means coated on said fibers.

8. A headliner as set forth in claim 6 in which said fibrous material is compacted and rigidified and held in its rigidified state with a phenolic resin.

9. A headliner as set forth in claim 6 in which said decorative sheet has opening means extending therethrough which improve the acoustical properties of said headliner.

10. A headliner as set forth in claim 1 and further comprising attaching means comprising said garnish molding for attaching said headliner to an associated automobile.

11. A headliner as set forth in claim 10 in which said attaching means comprises a plurality of attaching devices concealed by said garnish molding and headliner.

12. A headliner as set forth in claim 8 in which said attaching means comprises a plurality of spaced openings extending through said garnish molding, said spaced openings being adapted to receive associated fasteners therethrough.

13. In a method of making an automobile headliner comprising the steps of, compacting and rigidifying a layer of fibrous material to define a substrate which has a peripheral portion which is more highly compacted than the remainder thereof, providing a decorative sheet, and bonding said substrate and decorative sheet together as a single-piece laminate having a substantially soli cross section throughout, the improvement wherein said compacting and rigidifying step comprises forming an annular enlargement in said peripheral portion, said bonding step comprises covering said enlargement to define a sheet-covered enlargement which serves as an integral garnish molding for said headliner, said peripheral portion having an inside surface which is adapted to be disposed adjacent the roof of an automobile and said step of forming said enlargement comprises forming said enlargement which when viewed in cross section has a peripheral strip which is substantially parallel to said inside surface and a convex part inwardly of said peripheral strip, said convex part upon being disposed adjacent said roof being convex generally away from said roof and toward the interior of said automobile, said peripheral strip and convex part having said decorative sheet bonded thereagainst during said bonding step and comprising said sheet-covered enlargement, said step of forming said enlargement comprises forming said enlargement which when viewed in cross section has said peripheral edge which is disposed roughly perpendicular to said peripheral strip, and said bonding step also comprises bonding said decorative sheet against said edge and a surface portion of said inside surface which adjoins said peripheral edge, said surface portion having an edge turned part of said decorative sheet disposed thereagainst.

14. A method as set forth in claim 13 in which said step of forming said enlargement comprises forming said enlargement with a hollow rear portion, said enlargement when viewed in cross section having a peripheral edge which has an effective thickness which is greater than the thickness of said peripheral portion.

15. A method as set forth in claim 13 in which said step of forming said enlargement comprises forming said enlargement which when viewed in cross section also has a solid cross section throughout and has a peripheral edge which has an effective thickness which is greater than the thickness of said peripheral portion.

16. A method as set forth in claim 13 in which said compacting and rigidifying step comprises defining said substrate such that it has a main central area which is comparatively less compacted and is particularly adapted to provide thermal and acoustical insulation, and said main central area has a thickness which is generally of the order of several times greater than the thickness of said peripheral portion.

17. A method as set forth in claim 13 in which said compacting and rigidifying step comprises holding said fibrous material in its rigidified state with phenolic resin.

18. A method as set forth in claim 13 and comprising the further step of fastening a plurality of attaching devices to said headliner which are concealed by the garnish molding and headliner upon attaching same to said automobile.

19. A method as set forth in claim 13 and comprising the further step of defining a plurality of spaced openings through said garnish molding to serve as attaching means for said headliner.

* * * * *